(12) United States Patent
Visser et al.

(10) Patent No.: US 10,919,723 B2
(45) Date of Patent: Feb. 16, 2021

(54) CONVEYING APPARATUS AND METHOD FOR CONVEYING A TIRE LAYER

(71) Applicant: VMI HOLLAND B.V., Epe (NL)

(72) Inventors: Ruben Visser, Epe (NL); Mattheus Jacobus Kaagman, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 16/479,172

(22) PCT Filed: Jan. 11, 2018

(86) PCT No.: PCT/EP2018/050630
§ 371 (c)(1),
(2) Date: Jul. 18, 2019

(87) PCT Pub. No.: WO2018/134111
PCT Pub. Date: Jul. 26, 2018

(65) Prior Publication Data
US 2019/0344989 A1    Nov. 14, 2019

(30) Foreign Application Priority Data
Jan. 18, 2017   (NL) ...................................... 2018193

(51) Int. Cl.
*B65G 23/24* (2006.01)
*B65G 23/00* (2006.01)
(Continued)

(52) U.S. Cl.
CPC ......... *B65H 29/16* (2013.01); *B29D 30/0016* (2013.01); *B65H 29/58* (2013.01);
(Continued)

(58) Field of Classification Search
None
See application file for complete search history.

(56) References Cited

U.S. PATENT DOCUMENTS

| 3,724,657 A | * | 4/1973 | Katagiri | .................. B07C 3/065 |
| | | | | 271/301 |
| 3,898,116 A | | 8/1975 | Katagiri et al. | ............... 156/134 |

(Continued)

FOREIGN PATENT DOCUMENTS

| CN | 102196980 | 9/2011 | ............. B65H 29/16 |
| CN | 104379474 | 2/2015 | ............. B65G 47/53 |

(Continued)

OTHER PUBLICATIONS

Japanese Office Action (w/translation) issued in application No. 2018-534874. dated Aug. 7, 2019 (6 pgs).

(Continued)

*Primary Examiner* — Kavel Singh
(74) *Attorney, Agent, or Firm* — Hayes Soloway P.C.

(57) ABSTRACT

Disclosed is a conveying apparatus and method for conveying a tire layer, wherein the conveying apparatus includes a swivel conveyor with at least one endless belt or wire, a first pulley, a second pulley and a third pulley that define a minimal loop (L) for guiding the endless belt or wire along a conveying run and a return run, wherein the third pulley is arranged between the conveying run and the return run, and is swivable about a swivel axis (X) between a first swivel position and a second swivel position. The pivot position is chosen such that the length of the minimal loop when the third pulley is in the first swivel position is the same within a tolerance of less than 1 percent with respect to the length of the minimal loop when the third pulley is in the second swivel position.

39 Claims, 8 Drawing Sheets

(51) Int. Cl.
*B65H 29/58* (2006.01)
*B65H 29/16* (2006.01)
*B29D 30/00* (2006.01)
*B65H 35/00* (2006.01)

(52) U.S. Cl.
CPC . *B65H 35/0006* (2013.01); *B29D 2030/0038* (2013.01); *B65H 2404/2641* (2013.01); *B65H 2404/2691* (2013.01); *B65H 2801/93* (2013.01)

(56) References Cited

U.S. PATENT DOCUMENTS

| | | | | |
|---|---|---|---|---|
| 4,062,458 A | * | 12/1977 | Manini | B29B 15/02 414/268 |
| 4,221,627 A | | 9/1980 | Rost | 156/507 |
| 4,565,481 A | * | 1/1986 | Pagnoni | B30B 7/023 100/196 |
| 4,875,959 A | | 10/1989 | Kumagai | 156/123 |
| 5,059,274 A | | 10/1991 | Kumagai | 156/406.4 |
| 5,467,976 A | * | 11/1995 | Doucet | B65H 29/58 271/184 |
| 5,626,706 A | | 5/1997 | Akiyama | 156/324 |
| 5,628,174 A | | 5/1997 | Mack et al. | D01H 9/10 |
| 6,176,485 B1 | * | 1/2001 | Wingate | B65H 29/12 271/303 |
| 6,401,903 B1 | | 6/2002 | Berni | B65G 17/32 |
| 8,424,673 B2 | | 4/2013 | Ravat et al. | B65G 17/46 |
| 9,266,677 B2 | | 2/2016 | Isomura | |
| 2003/0217627 A1 | | 11/2003 | Teshima | 83/409 |

FOREIGN PATENT DOCUMENTS

| | | | |
|---|---|---|---|
| DE | 2638884 | 3/1978 | B21D 43/28 |
| DE | 3733318 | 4/1989 | B29C 31/00 |
| DE | 102007025384 | 11/2008 | B23D 15/04 |
| EP | 0744278 | 11/1996 | B29C 65/00 |
| GB | 2230515 | 10/1990 | B65H 29/68 |
| JP | S4972377 | 7/1974 | B29C 67/00 |
| JP | S6378736 | 4/1988 | B29D 30/30 |
| JP | 2003341906 | 12/2003 | B65H 29/12 |

OTHER PUBLICATIONS

Decision to Grant issued in related Japanese Patent Application Serial No. 2018-534874, dated Nov. 29, 2019 with translation (5 pages).
International Search Report and Written Opinion issued in application No. PCT/EP2018/050630, dated Mar. 21, 2018 (11 pgs).
Chinese Office Action (w/translation) issued in application No. 201880014443.2, dated May 20, 2020 (12 pgs).

* cited by examiner

CONVEYING APPARATUS AND METHOD FOR CONVEYING A TIRE LAYER

BACKGROUND

The invention relates to a conveying apparatus and a method for conveying a tire layer.

U.S. Pat. No. 3,898,116 A discloses an apparatus for manufacturing a structure for a green tire. A first carcass sheet is supplied from stock and conveyed via a basic supply conveyor and a basic laminating conveyor to a drum. Additional laminating conveyors are provided for supplying additional carcass sheets onto the basic laminating conveyor. The additional laminating conveyors are provided with a sloped portion to deliver the additional carcass sheet onto the basic laminating conveyor at an angle.

At the transition from the sloped portion of the additional laminating conveyors to the basic laminating conveyor, the additional carcass sheets tend to deform, e.g. as a result of tension in the material. The additional carcass sheet may start to wave, making it impossible to accurately cut, laminate and/or apply the carcass sheets.

It is an object of the present invention to provide a conveying apparatus and a method for conveying a tire layer, wherein the deformation of the tire layer can be reduced or prevented.

SUMMARY OF THE INVENTION

According to a first aspect, the invention provides a conveying apparatus for conveying a tire layer, wherein the conveying apparatus comprises a swivel conveyor with at least one endless belt or wire and a first pulley, a second pulley and a third pulley that define a minimal loop for guiding said at least one endless belt or wire along a conveying run and a return run, wherein the first pulley defines at least a first part of the conveying run, wherein the second pulley defines at least a first part of the return run and wherein the third pulley is arranged between the first part of the conveying run and the first part of the return run, wherein the third pulley is swivable with respect to the first pulley and the second pulley about a swivel axis that is located at a pivot position spaced apart from the third pulley towards the first pulley and the second pulley, wherein the third pulley is swivable about said swivel axis between a first swivel position and a second swivel position to align the first part of the conveying run with a first conveying plane and a second conveying plane, respectively, wherein the minimal loop has a length, wherein the pivot position is chosen such that the length of the minimal loop when the third pulley is in the first swivel position is the same within a tolerance of less than 1 percent with respect to the length of the minimal loop when the third pulley is in the second swivel position.

The swivel conveyor can be aligned with either the first conveying plane or the second conveying plane to receive the tire layer from conveying planes at different orientations. By aligning the swivel conveyor with a selected one of the conveying planes, an abrupt change in the direction of the tire layer at the transition from the conveying planes to the swivel conveyor can be prevented. Hence, the undesirable side-effects of the prior art apparatus, such as waving, can be reduced or even prevented. As the length of the minimal loop is kept substantially the same, there is minimal or no change in tension in the at least one endless belt or wire along the conveying run and the return run of said minimal loop during the swiveling of the third pulley. The change in length of the minimal loop, if any, is so small that it is not perceivable by the naked eye. As the length of the minimal loop remains substantially the same during the swiveling, the swivel conveyor can do without complex tensioning means and can thus be kept relatively simple in construction.

Preferably, the tolerance is less than 0.4 percent, more preferably less than 0.1 percent and most preferably less than 0.05 percent. When the tolerance is reduced, tension changes in the at least one endless belt or wire as a result of the swiveling can be reduced even further. In particular, with the specified tolerance, it can be prevented that the at least one belt or wire is stretched beyond its maximum allowable (or workable) tensile stress as specified by the manufactured. Typically, the maximum allowable tensile stress of a belt with steel inlay cords is reached at a stretch level of 0.4 percent.

In a preferred embodiment the tolerance is less than one-tenth of a millimeter, preferably less than one-twentieth of a millimeter and most preferably less than one-fiftieth of a millimeter. When the tolerance is reduced, tension changes in the at least one endless belt or wire as a result of the swiveling can be reduced even further.

In a further preferred embodiment the pivot position is chosen such that the length of the minimal loop is the same within the tolerance for any swivel position of the third pulley about the swivel axis between the first swivel position and the second swivel position. Hence, the third pulley can be moved from the first swivel position to the second swivel position or any intermediate swivel position without exceeding the tolerance.

In a further preferred embodiment the first pulley and the second pulley have a first circumference and a second circumference, respectively, wherein the first circumference and the second circumference are connectable by two outer tangents that define an intermediate area between the first pulley and the second pulley, wherein the pivot position is located inside the intermediate area. It has been found that when the pivot position is chosen in said intermediate area, the tolerance in the loop length can be kept to a minimum.

In a further preferred embodiment the third pulley has a third pulley axis that is movable along a circular path that is concentric to the pivot position, wherein the third pulley axis is at a first path point and at a second path point on the circular path when the third pulley is in the first swivel position and the second swivel position, respectively, wherein the first pulley and the second pulley have a first circumference and a second circumference, respectively, wherein the circular path between the first path point and the second path point comprises a circular arc that approximates a first elliptical path defined by a first focus point that is located on or within the first circumference, a second focus point that is located on or within the second circumference and the first path point. The sum of the lengths between the first path point and each of the focus points is constant when the first path point moves along the first elliptical path. Hence, when the third pulley axis is made to move along a circular arc that approximates the first elliptical path between the first swivel position and the second swivel position, the loop length between the first pulley, the second pulley and the third pulley can be kept constant or substantially constant as well.

In an embodiment thereof the circular arc approximates the average of the first elliptical path and a second elliptical path that is defined by the first focus point, the second focus point and the second path point. Hence, by approximating the average of the first elliptical path and the second elliptical path defined by the third pulley in the first swivel position and the second swivel position, respectively, the pivot position can be optimized so that the circular arc is the best approximation of both elliptical paths.

In a further embodiment thereof the first part of the conveying run extends between the first pulley and the third pulley and tangentially meets the first circumference at the first focus point, wherein the first part of the return run extends between the second pulley and the third pulley and tangentially meets the second circumference at the second focus point, wherein the first focus point and the second focus point shift along the first circumference and the second circumference, respectively, as the third pulley is swivelled between the first swivel position and the second swivel position. Hence, the first focus point and the second focus point are not the same for the first elliptical path and the second elliptical path. Consequently the first elliptical path and the second elliptical path are not the same. By moving the third pulley along a circular arc that approximating the average of the first elliptical path and the second elliptical path between the first path point and the second path point, the loop length between the first pulley, the second pulley and the third pulley can be kept constant or substantially constant.

In an embodiment the first pulley and the second pulley have a first pulley axis and a second pulley axis, respectively, wherein the first pulley axis and the second pulley axis are connectable by a center-to-center line, wherein the pivot position is located at the opposite side of the center-to-center line with respect to the third pulley. The third pulley is movable along a circular arc that approximates an elliptical path. Due to the eccentricity of the elliptical path, i.e. the deviation of said elliptical path from being circular, the pivot position at the center of the circular arc will typically be located at the opposite side of or behind the center of the elliptical path with respect to the third pulley. In this exemplary embodiment, the center of the elliptical path is defined at or near the center-to-center line.

In another embodiment the first pulley and the second pulley have a first pulley axis and a second pulley axis, respectively, wherein the first pulley axis and the second pulley axis are connectable by a center-to-center line, wherein the pivot position is projectable onto the center-to-center line in a direction normal to said center-to-center line at half or approximately half the distance between the first pulley axis and the second pulley axis. Hence, the circular arc can be located about a pivot position that is projectable onto the center of the elliptical path that the circular arc is supposed to approximate.

In another embodiment the first swivel position and the second swivel position are offset with respect to each other about the swivel axis over a swivel angle of less than forty degrees, preferably less than thirty degrees and most preferably less than twenty-five degrees. When the swivel angle is small, the elliptical path between the first swivel position and the second swivel position starts to resemble a circular arc. Hence, the deviation of the circular arc along which the third pulley is moved with respect to the elliptical path can be decreased to such an extent that the loop length can be kept the same or substantially the same.

In a further embodiment thereof the first swivel position and the second swivel position are offset with respect to each other about the pivot position over a swivel angle of at least than ten degrees, preferably at least fifteen degrees and most preferably at least twenty degrees. Thus, the swivel positions are far enough apart to align the swivel conveyor with two distinct conveying planes which are offset over the same angle.

In another embodiment the swivel conveyor comprises a swivel arm for supporting the third pulley in a swivable manner about the swivel axis. Said swivel arm can mechanically guide the motion of the third pulley along a circular arc about the swivel axis.

In an embodiment thereof the swivel conveyor comprises a swivel drive that is arranged to drive the swivel arm in a swivelling motion about the swivel axis to swivel the third pulley between the first swivel position and the second swivel position. Said swivel drive can engage directly onto the swivel arm at the swivel axis or may alternatively engage the swivel arm along the length thereof, e.g. with the use of a piston.

In an embodiment at least one of the plurality of pulleys is a driven pulley for driving the at least one endless belt or wire.

In an embodiment the at least one endless belt is a toothed belt, wherein the at least one drive pulley is a toothed drive pulley that is arranged to engage with the toothed belt to drive said toothed belt. A toothed drive pulley can reliable engage the toothed belt. In particular, the risk of the toothed belt slipping with respect to the toothed drive pulley can be reduced or even eliminated. However, such a toothed drive pulley requires a rigid toothed belt that has a constant or substantially constant loop length. Hence, the swivel conveyor according to the invention is particularly useful when using a toothed drive pulley to drive a toothed belt.

Preferably, the second pulley is the drive pulley.

In an embodiment the conveying run of the at least one endless belt or wire is arranged to be driven in a direction of conveyance, wherein the third pulley is a tail pulley with respect to said direction of conveyance. Hence, the third pulley can be swivelled to align the first part of the conveying run with the first conveying plane or the second conveying plane to receive the tire layer in the direction of conveyance onto the swivel conveyor.

In an embodiment thereof the swivel conveyor comprises a fourth pulley on the opposite side of the first pulley and the second pulley with respect to the third pulley, wherein the fourth pulley is arranged for, together with the first pulley, forming at least a second part of the conveying run downstream of the first part of the conveying run in the direction of conveyance. The fourth pulley thus expands the actual loop of the at least one endless belt or wire with respect to the minimal loop between the first pulley, the second pulley and the third pulley. Said second part of the conveying run can have a different orientation than the first part of the conveying run. In particular, the second part of the conveying run can be held stationary while the first part of the conveying run swivels with respect to the second part of the conveying run.

In an embodiment thereof the fourth pulley is a head pulley with respect to the direction of conveyance. Hence, the swivel conveyor is arranged for discharging the tire layer from the second part of the conveying run downstream in the direction of conveyance.

In an embodiment the swivel conveyor comprises a plurality of the endless belts or wires, wherein each endless belt or wire extends in an actual loop around the plurality of pulleys, wherein the conveying runs of the respective endless belts or wires are arranged to be driven in a direction of conveyance, wherein the endless belts or wires are arranged side by side in a lateral direction perpendicular to the direction of conveyance. By providing a plurality of the endless belts or wires side by side, the risk of the endless belts or wires running off to a side of the swivel conveyor can be reduced.

In an embodiment thereof the endless belts or wires are spaced apart in the lateral direction. By spacing said endless belts or wires apart, interference between the endless belts or wires can be prevented. The spacing can further allow for other parts of the swivel conveyor to be moved through said spacing, e.g. for performing operations, such as holding, lifting, detecting, marking, punching, measuring or cutting, on the tire layer at the conveying run.

In an embodiment thereof the swivel conveyor comprises a cutting device that is movable from a retracted position within the actual loops of the respective endless belts or wires into a cutting position in which the cutting device protrudes at least partially outside the actual loops and through the spacing between the respective endless belts or wires at the conveying run. Said cutting device can be used to cut the tire layer at the conveying run. The cutting device can at least partially be integrated in or incorporated inside the loop of the endless belts or wires, while the spacing allows for at least a part of the cutting device to be extended through said spacing to perform a cutting operation on the tire layer.

In an embodiment thereof that includes the aforementioned cutting device, the cutting device is arranged to protrude at least partially outside the actual loops and through the spacing between the respective endless belts or wires at the second part of the conveying run. Said second part of the conveying run can be positioned independently from the swivelling first part of the conveying run. More in particular, the second part of the conveying run can be kept stationary to allow for accurate cutting of the tire layer.

In a further embodiment thereof the cutting device comprises a beam that is arranged to extend on the inside of the actual loops of the respective endless belts or wires at the conveying run and an anvil that is arranged to be movable with respect to said beam through the spacing between the respective endless belts or wires at the conveying run from the retracted position into the cutting position. The anvil can be used to cooperate with a knife, e.g. to support the tire layer with respect to said knife to allow for accurate cutting. More in particular, the anvil can lift at least a part of the tire layer above the endless belts or wires to allow for the knife to cut into the tire layer without cutting into the endless belts or wires.

In an embodiment thereof the cutting device comprises a plurality of push-up members that are arranged to be movable with respect to said beam through the spacing between the respective endless belts or wires at the conveying run from the retracted position into the cutting position. Said push-up members can be used to push-up the tire layer along a cutting line to allow for the knife to cut into the tire layer along said cutting line without cutting into the endless belts or wires.

In a further embodiment thereof the beam comprises a plurality of supports that are arranged to be flush or substantially flush with the endless belts or wires in the spacing between said endless belts or wires at the conveying run to support the tire layer. The supports can prevent slacking of the tire layer between the endless belts or wires.

In a further embodiment thereof the beam has a bevelled edge facing opposite to the direction of conveyance to deflect the tire layer over the beam in said direction of conveyance. Hence, it can be prevented that the beam bites into the tire layer as the tire layer moves over the beam in the direction of conveyance.

In a further embodiment thereof the beam extends along a cutting line for cooperating with a knife along said cutting line, wherein the cutting line is at fifty millimeters or less, and preferably at thirty millimeters or less from the fourth pulley. The relatively small distance of the cutting line to the fourth pulley allows for cutting-off a relatively short part of the tire layer and discharging said short part, e.g. as waste, prior to cutting-off a subsequent part of the tire layer.

In a preferred embodiment the first pulley, the second pulley and/or the third pulley are provided with a plurality of circumferentially extending guide elements at the spacing between the respective endless belts or wires for guiding the respective endless belts or wires. Said guide elements can deflect and/or contain the endless belts or wires on the respective pulleys and prevent that the endless belts or wires run-off into each other or to the sides of said pulleys.

In an embodiment thereof the guide elements are arranged to be flush or substantially flush with the endless belts or wires in the spacing between said endless belts or wires at the conveying run to support the tire layer. Hence, like the supports at the beam, the guide elements can prevent slacking of the tire layer in the spacing between the endless belts or wires.

In another embodiment the conveying apparatus further comprises a first supply conveyor and a second supply conveyor extending in the first conveying plane and the second conveying plane, respectively, upstream of the swivel conveyor and a discharge conveyor extending in a third conveying plane downstream of the swivel conveyor in the direction of conveyance, wherein the swivel conveyor is arranged to convey a first tire layer from the first supply conveyor to the discharge conveyor when the first part of the conveying run is aligned with the first conveying plane and to convey a second tire layer from the second supply conveyor to the discharge conveyor when the first part of the conveying run is aligned with the second conveying plane. Hence, the swivel conveyor can be conveniently positioned between the first supply conveyor and the second supply conveyor upstream of the swivel conveyor and the discharge conveyor downstream of the swivel conveyor. One or more tire layers can be selectively received from the first supply conveyor or the second supply conveyor and discharged to the discharge conveyor for further handling. This setup is typically used in a carcass building station where several carcass sheets are supplied to, laminated and/or cut at the conveying apparatus before being discharged to a carcass building drum.

In an embodiment thereof the first conveying plane and the third conveying plane are parallel, substantially parallel or within less than two degrees from each other. Hence, the tire layer can be conveyed from the first supply conveyor, over the conveying run at the swivel conveyor and onto the discharge conveyor in a substantially level plane of conveyance. Hence, waving as a result of abrupt changes in the direction of the tire layer can be prevented.

In a further embodiment thereof the second conveying plane is offset over a swivel angle of less than forty degrees, preferably less than thirty degrees and most preferably less than twenty-five degrees with respect to the first conveying plane. The first part of the conveying run can thus be aligned with either the first conveying plane or the second conveying plane. By aligning the first part of the conveying run with the second conveying plane, the tire layer can be received onto the first part of the conveying run in a level conveying plane to prevent waving of the tire layer at the transition from the second supply conveyor to the swivel conveyor.

According to a second aspect, the invention provides a method for conveying a tire layer with the use of the aforementioned conveying apparatus, wherein the method comprises the step of swiveling the third pulley with respect to the first pulley and the second pulley about the swivel axis between the first swivel position and the second swivel position while keeping the length of the minimal loop the same within the tolerance when the third pulley is in the first swivel position and in the second swivel position.

The method relates to the practical implementation of the conveying apparatus according to the first aspect of the invention. Hence, the advantages thereof correspond to the advantages of the conveying apparatus and its respective embodiments and will not be repeated hereafter.

In a preferred embodiment of the method the length of the minimal loop is kept the same within the tolerance for any swivel position of the third pulley about the swivel axis between the first swivel position and the second swivel position.

In a further preferred embodiment of the method the conveying apparatus further comprises a first supply conveyor and a second supply conveyor extending in the first conveying plane and the second conveying plane, respectively, upstream of the swivel conveyor and a discharge conveyor extending in a third conveying plane downstream of the swivel conveyor in the direction of conveyance, wherein the method further comprises the step of using the swivel conveyor to convey a first tire layer from the first supply conveyor to the discharge conveyor when the first part of the conveying run is aligned with the first conveying plane and to convey a second tire layer from the second supply conveyor to the discharge conveyor when the first part of the conveying run is aligned with the second conveying plane.

In an embodiment thereof the method further comprises the steps of cutting off a part of the first tire layer or the second tire layer at the conveying run of the swivel conveyor, discharging the cut-off part onto the discharge conveyor and retracting the remaining part of the first tire layer or the second tire layer in a retraction direction opposite to the direction of conveyance. The tire layer comprises tacky rubber material. Retracting the remaining part of the tire layer can prevent that the cut-off part of the tire layer attaches or adheres itself again to the remaining part of the tire layer. The cut-off part of the tire layer can thus be reliably discharged.

In another embodiment the method further comprises the step of replacing the at least one endless belt or wire during maintenance, wherein the at least one endless belt or wire is removable from the first pulley, the second pulley and the third pulley in a lateral direction parallel to the swivel axis. Hence, the endless belt or wire can easily be removed and replaced with a new endless belt, simply by sliding it off the swivel conveyor in the lateral direction.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
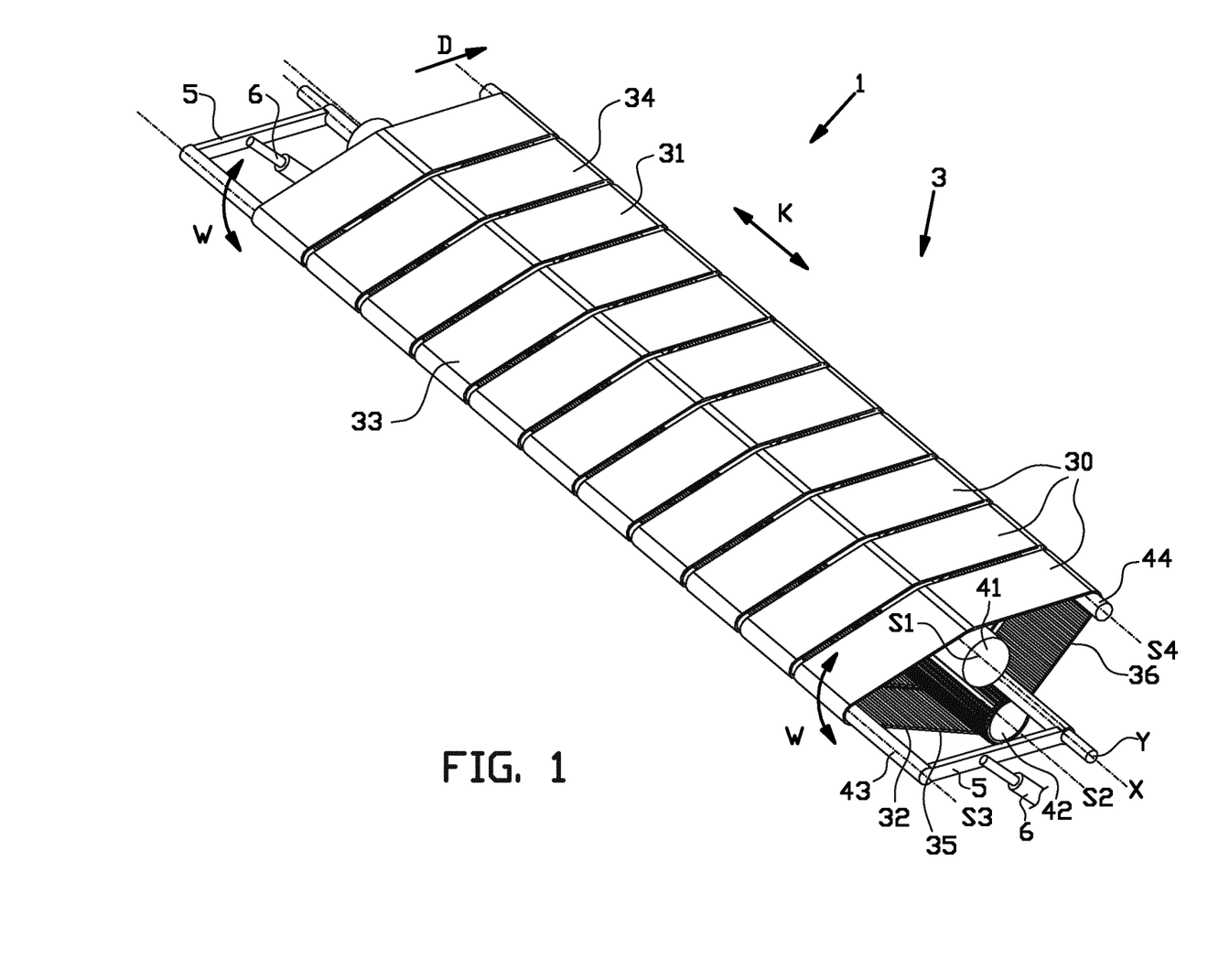
FIG. 1 shows an isometric view of a conveying apparatus according to a first exemplary embodiment of the invention.
Figure 2:
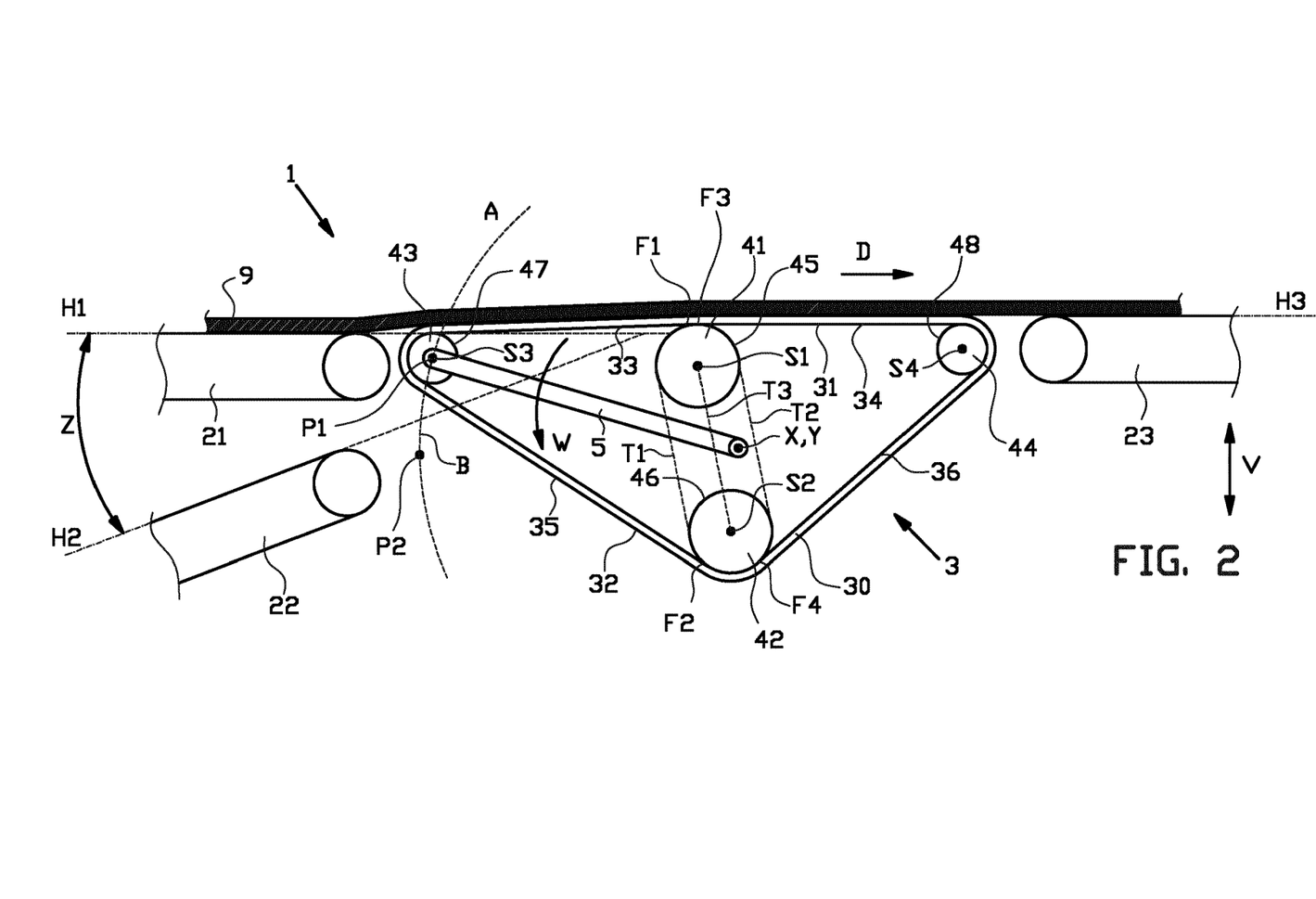
FIGS. 2 and 3 show side views of the conveying apparatus according to FIG. 1.
Figure 3:
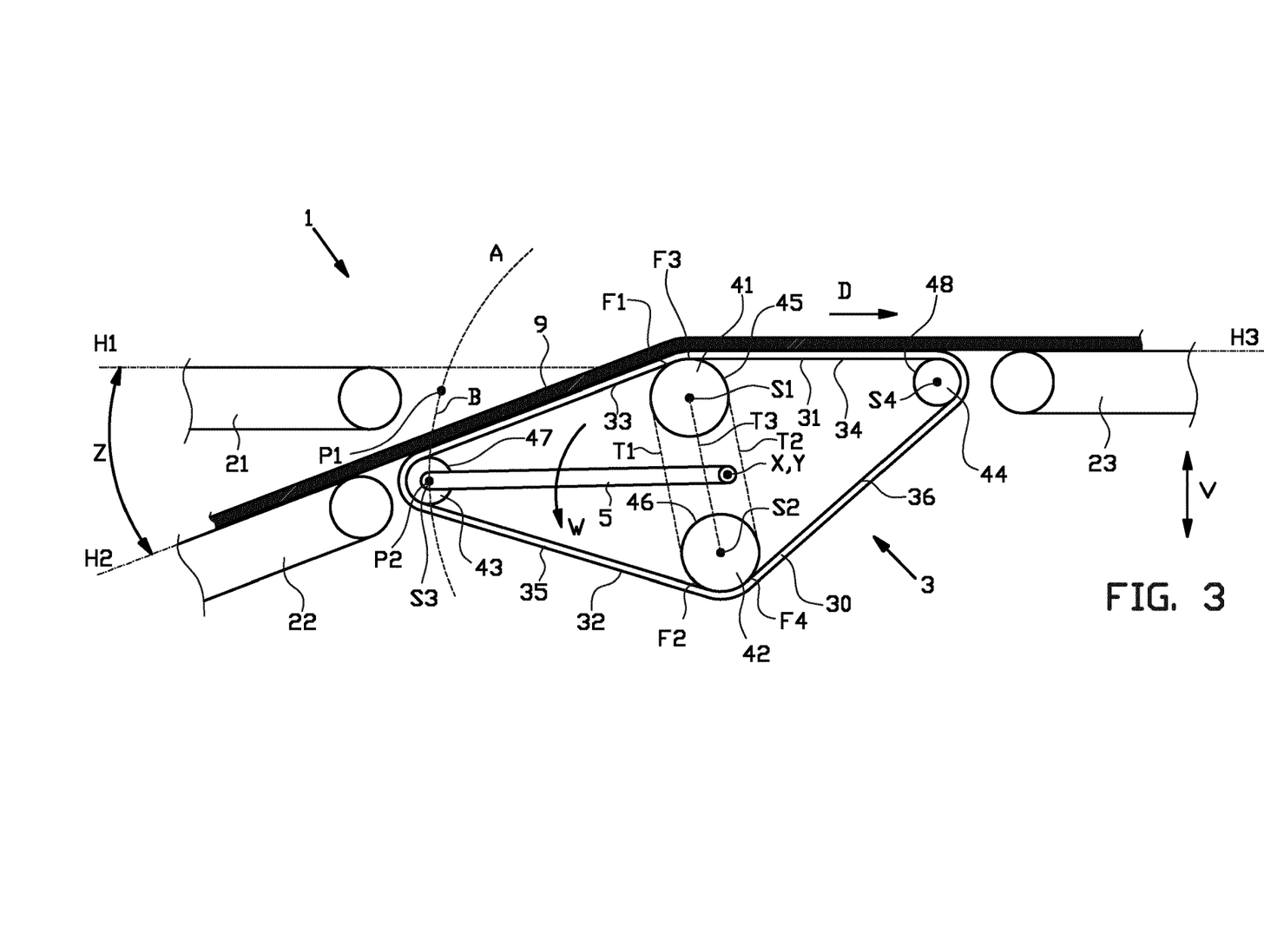

FIG. 1 shows a conveying apparatus 1 with a swivel conveyor 3. As shown in FIGS. 2 and 3, the conveying apparatus 1 further comprises a first supply conveyor 21, a second supply conveyor 22 and a discharge conveyor 23. The swivel conveyor 3 is arranged for conveying a tire layer 9 in a direction of conveyance D from one of the first supply conveyor 21 and the second supply conveyor 22 upstream of said swivel conveyor 3 in the direction of conveyance D to the discharge conveyor 23 downstream of the swivel conveyor 3 in the direction of conveyance D. Said swivel conveyor 3 can be used to selectively receive one or more tire layers 9 from the first supply conveyor 21 and the second supply conveyor 22. This is for example useful in a carcass building station, where tire layers 9 in the form of carcass sheets are supplied to, laminated and/or cut at the conveying apparatus 1 before being discharged to a carcass building drum (not shown).

As shown in FIGS. 2 and 3, the first supply conveyor 21 and the second supply conveyor 22 extend in a first conveying plane H1 and a second conveying plane H2, respectively. The discharge conveyor 23 extends in a third conveying plane H3. The first conveying plane H1 and the third conveying plane H3 are preferably in line, coplanar, parallel, substantially parallel or within two degrees from each other. Hence, the tire layer 9 can be conveyed from the first supply conveyor 21, over the swivel conveyor 3 and onto the discharge conveyor 23 in a substantially level plane of conveyance. The second plane of conveyance H2 is offset over a swivel angle Z of less than forty degrees, preferably less than thirty degrees and most preferably less than twenty-five degrees with respect to the first conveying plane H1. In this exemplary embodiment, the second conveying plane H2 extends below the first conveying plane H1.

As best seen in FIG. 1, the swivel conveyor 3 comprises a plurality of endless belts 30 for conveying the tire layer 9 and a plurality of pulleys 41, 42, 43, 44 for guiding said plurality of endless belts 30 in a loop around said pulleys 41-44. The endless belts 30 are preferably toothed belts. The teeth are provided on the inside of the loop. The loop comprises a conveying run 31 and a return run 32. The conveying run 31 is the run of the loop that carries and conveys the tire layer 9. The loop has a loop length. Each of the one or more endless belts 30 has length that corresponds to said loop length. In this exemplary embodiment, the conveying run 31 is an upper run of the loop and the return run 32 is a lower run of the loop.

In an alternative embodiment (not shown), the swivel conveyor 3 may comprises a single endless belt 30 instead of a plurality of endless belts 30. The plurality of endless belts 30 is preferred because they are easier to handle, to replace and are less likely to run-off the sides of the pulleys 41-44. In a further alternative embodiment (not shown) the endless belts 30 may be endless wires.

As best seen in FIGS. 2-6, the plurality of pulleys 41-44 comprises a first pulley 41 that defines the conveying run 31, a second pulley 42 that defines the return run 32 and a third pulley 43 that is arranged between the conveying run 31 and the return run 32. In this exemplary embodiment, the third pulley 43 is a tail pulley with respect to the direction of conveyance D and the plurality of pulleys 41-44 further comprises a fourth pulley 44 that is arranged between the conveying run 31 and the return run 32 on the opposite side of the first pulley 41 and the second pulley 42 with respect to the third pulley 43. The swivel conveyor 3 may comprises fifth or further pulleys (not shown). The first pulley 41, the second pulley 42, the third pulley 43 and the fourth pulley 44 are rotatable about a first pulley axis S1, a second pulley axis S2, a third pulley axis S3 and a fourth pulley axis S4, respectively. The first pulley 41, the second pulley 42, the third pulley 43 and the fourth pulley 44 further have a first circumference 45, a second circumference 46, a third circumference 47 and a fourth circumference 48, respectively, concentric to their respective pulley axes S1-S4. One of the pulleys 41-44 is a driven pulley, preferably a toothed driven pulley. In this exemplary embodiment, the second pulley 42 is a toothed driven pulley. The teeth of the toothed driven pulley are arranged to engage with the teeth of the one or more toothed belts 30.

More in particular, the first pulley 41 is arranged for, together with the third pulley 43, forming a first part 33 of the conveying run 31. The first pulley 41 is arranged for, together with the fourth pulley 44, forming a second part 34 of the conveying run 31 downstream of the first part 33 of the conveying run 31 with respect to the direction of conveyance D. Similarly, the second pulley 42 is arranged for, together with the third pulley 43, forming a first part 35 of the return run 32. The second pulley 42 is arranged for, together with the fourth pulley 44, forming a second part 36 of the return run 32 downstream of the first part 35 of the return run 32 with respect to the direction of conveyance D. Consequently, the first pulley 41 is arranged between the first part 33 and the second part 34 of the conveying run 31, the second pulley 42 is arranged between the first part 35 and the second part 36 of the return run 32, the third pulley 43 is arranged between the first part 33 of the conveying run 31 and the first part 35 of the return run 32 and the fourth pulley 44 is arranged between the second part 34 of the conveying run 31 and the second part 36 of the return run 32.

Figure 8:
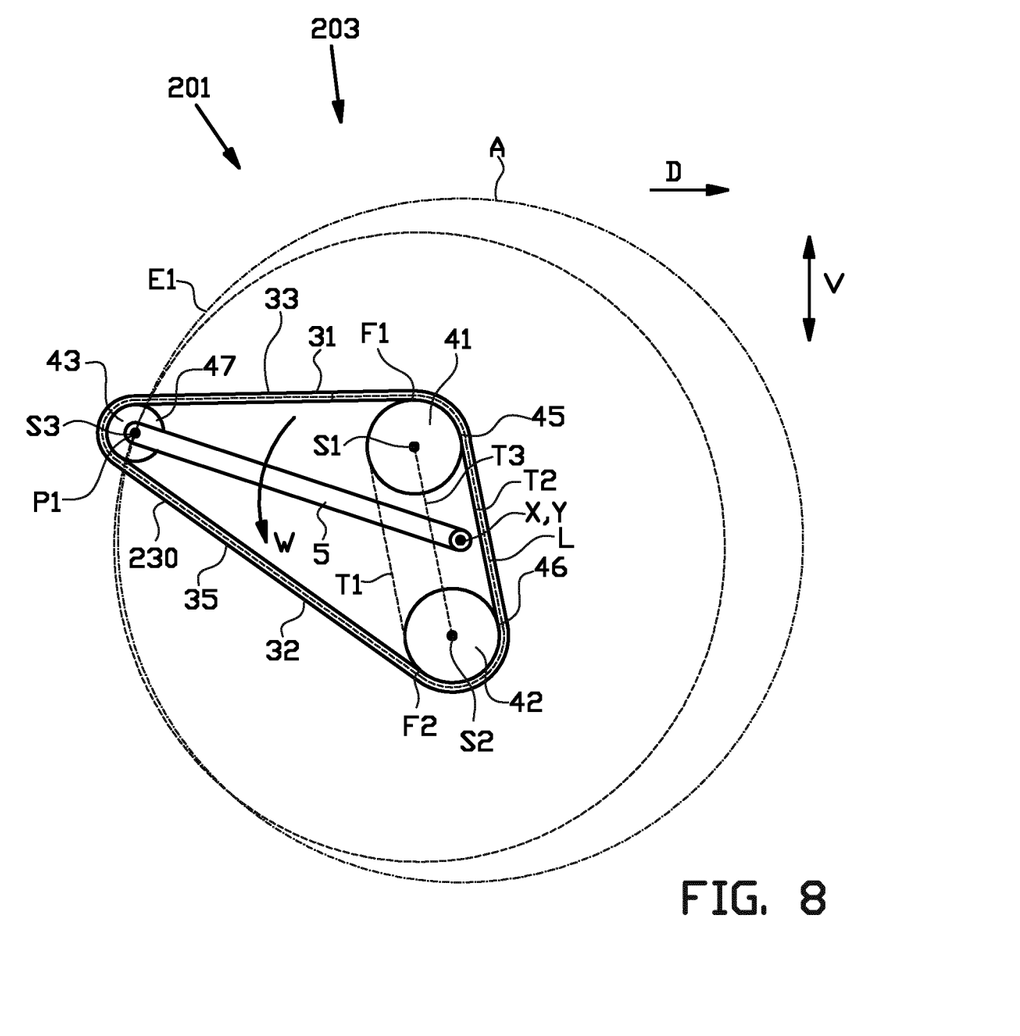
FIG. 8 shows a side view of a further alternative conveying apparatus according to a third exemplary embodiment of the invention.

In this exemplary embodiment, the first pulley 41, second pulley 42 and the fourth pulley 44 are in fixed relative positions with respect to each other. Hence, the length of the endless belts 30 in the second part 34 of the conveying run 31 and the second part 36 of the return run 32 remains constant, regardless of the swivelling at the third pulley 43. Hence, the fourth pulley 44 is entirely optional. FIG. 8 shows an alternative conveying apparatus 201 with a swivel conveyor 203 in which the fourth pulley 44 is left out and wherein the endless belts 230 extend directly from the first pulley 41 to the second pulley 42. Alternatively, the conveying apparatus may be provided with fourth or further pulleys (not shown), which should be of no influence on the minimal loop L around the first pulley 41, the second pulley 42 and the third pulley 43.

For the purpose of explaining the present invention, the loop around the first pulley 41, the second pulley 42 and the third pulley 43 is referred to as a 'minimal loop' L and the actual loop of the endless belts 30, 230 around the plurality of pulleys 41-44, whether or not that includes the fourth pulley 44, is referred to as an 'actual loop'. In a three pulley system of the first pulley 41, the second pulley 42 and the third pulley 43 the actual loops of the endless belts 30 correspond to the minimal loop L. When the actual loops includes the fourth pulley 44 or further pulleys, the actual loops are greater than the minimal loop L that still virtually extends around the first pulley 41, the second pulley 42 and the third pulley 43.

As shown in FIGS. 1, 2 and 3, the third pulley 43 is swivable in a swivelling motion W about a swivel axis X with respect to the first pulley 41 and the second pulley 42. The swivel axis X is located at a pivot position Y spaced apart from the third pulley 43 towards the first pulley 41 and the second pulley 42. The third pulley 43 is swivable about said swivel axis X between a first swivel position, as shown in FIGS. 2 and 4, and a second swivel position, as shown in FIGS. 3 and 6, to align the first part 33 of the conveying run 31 with the first supply conveyor 21 in the first conveying plane H1 and with the second supply conveyor 22 in the second conveying plane H2, respectively.

Figure 4:
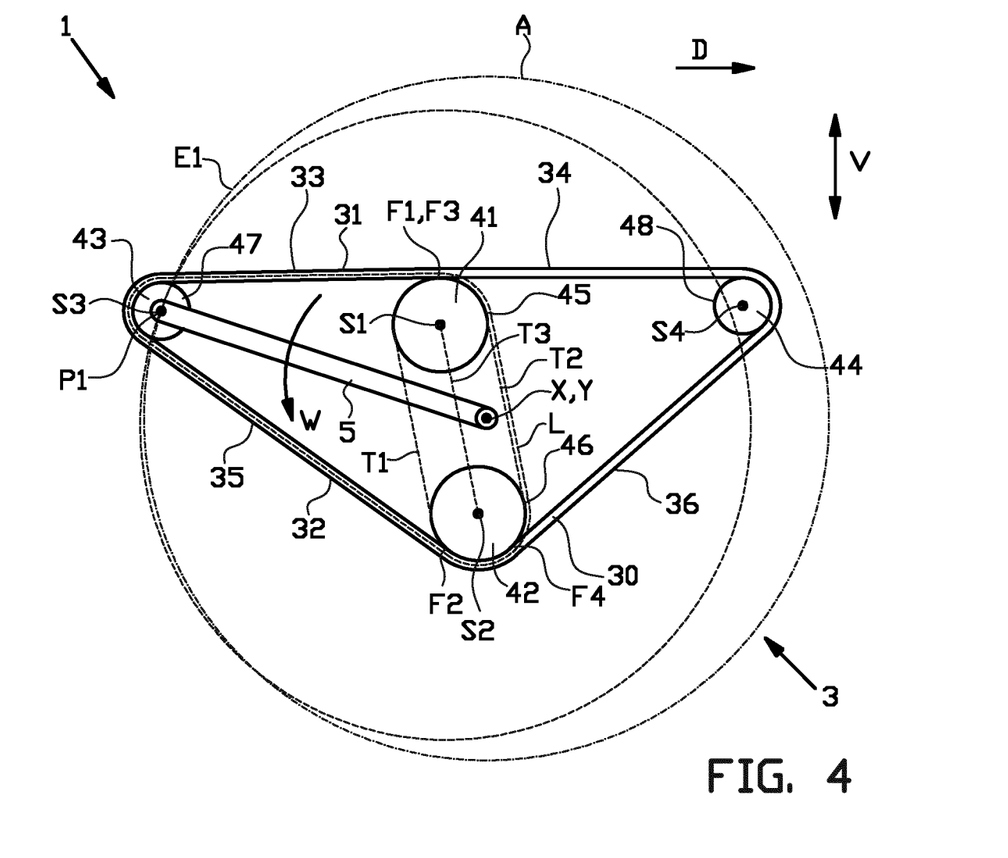
FIGS. 4, 5 and 6 show side views of the conveying apparatus according to FIG. 1 in three different swivel positions.
Figure 5:
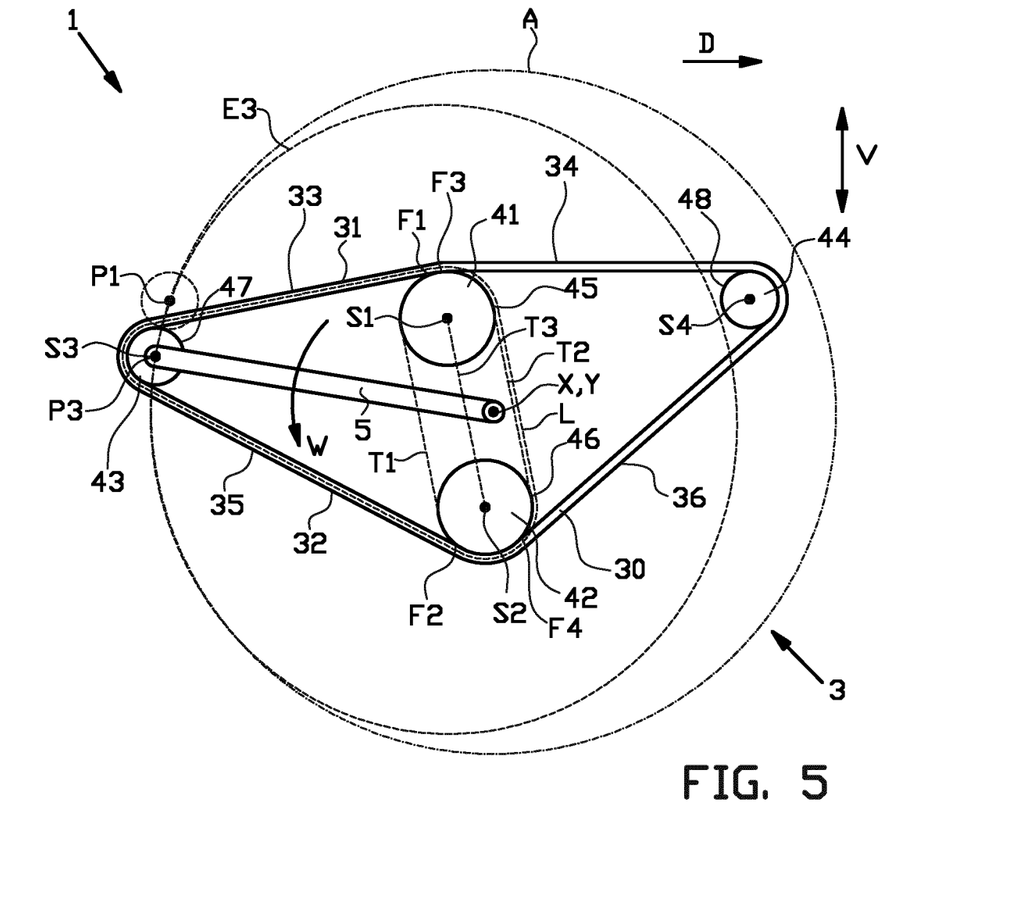
Figure 6:
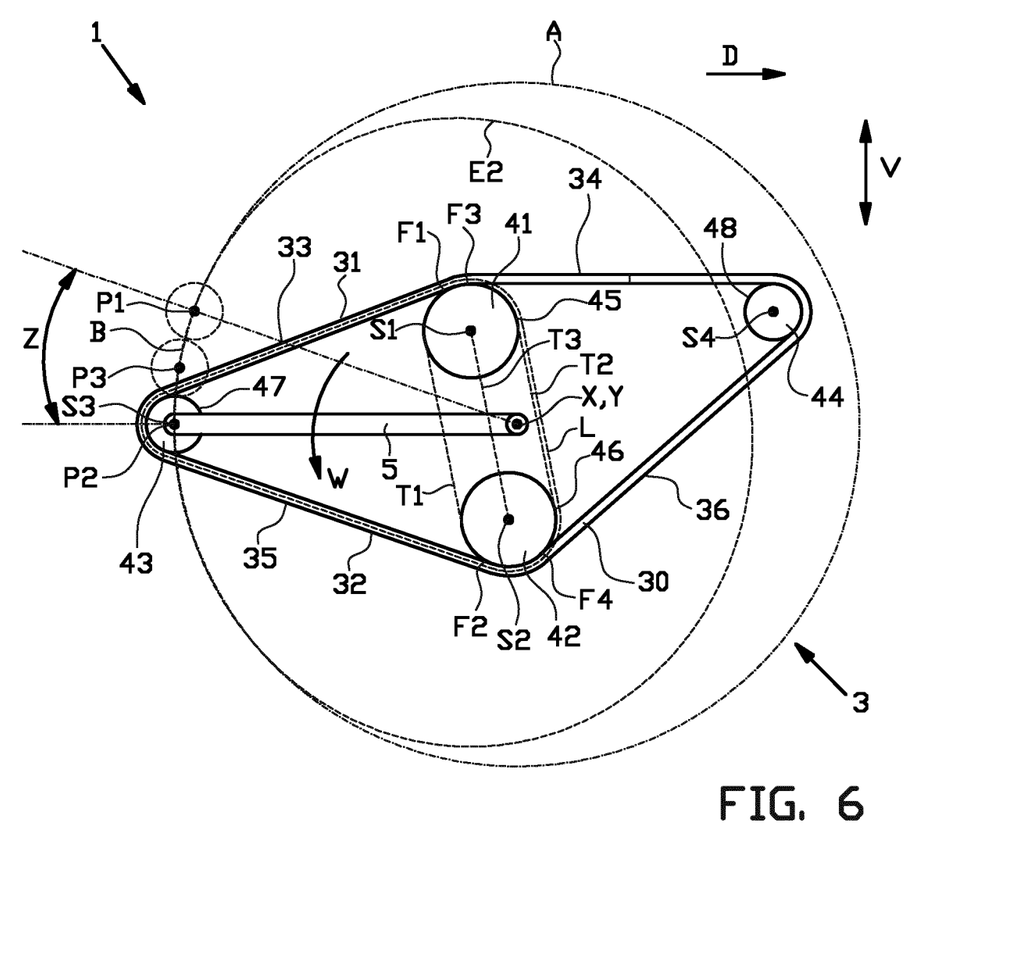

The pivot position Y is chosen such that the length of the minimal loop L is the same in the first swivel position of the third pulley 43, as shown in FIGS. 2 and 4, with respect to the second swivel position of the third pulley 43, as shown in FIGS. 3 and 6, within a tolerance of less than 1 percent, preferably less than 0.4 percent, more preferably less than 0.1 percent and most preferably less than 0.05 percent. Alternatively, the tolerance is less than half a millimeter when the third pulley 43 is in the first swivel position, as shown in FIGS. 2 and 4, and in the second swivel position, as shown in FIGS. 3 and 6. Preferably, the tolerance is less than one-tenth of a millimeter, more preferably less than one-twentieth of a millimeter and most preferably less than one-fiftieth of a millimeter. The pivot position Y is preferably chosen such that the length of the minimal loop L is the same within the tolerance for any swivel position of the third pulley 43, e.g. the intermediate swivel position as shown in FIG. 5, about the swivel axis X between the first swivel position, as shown in FIGS. 2 and 4, and the second swivel position, as shown in FIGS. 3 and 6.

The pivot position Y is chosen based on the principle that the length of the minimal loop L stays constant when the third pulley 43 is moved along an elliptical path that is defined by a first focus point F1, a second focus point F2 and a path point on the curvature of said elliptical path. The third pulley 43 however moves along a circular path A concentric to the pivot position Y. Due to the eccentricity of an elliptical path, such circular path A can only partially approximate the elliptical path. However, if the eccentricity is close to zero or if only a small arc length of the circular path A is used to approximate the elliptical path, then the deviation of the circular path A with respect to the elliptical path can be minimized.

To make matters more complex, the first focus point F1 and the second focus point F2 that define the elliptical path are located on the first circumference 45 and the second circumference 46, respectively. More in particular the first focus point F1 is located at the position where the first part 33 of the conveying run 31 tangentially meets or joins the first circumference 45 of the first pulley 41 and the second focus point F2 is located at the position where the first part 35 of the return run 32 tangentially meets or joins the second circumference 46 of the second pulley 42. Said focus points F1, F2 shift over the respective circumferences 45, 46 as the third pulley 43 swivels about the swivel axis X at the pivot position Y. Hence, for an optimal approximation of the elliptical path that should be followed by the third pulley axis S3, one should actually approximate the average of several elliptical paths defined by different focus points F1, F2 in the different swivel positions of the third pulley 43.

Note that the length of the actual loops of the endless belts 30 between the first pulley 41, the second pulley 42 and the fourth pulley 44 remains constant. In particular, it can be observed that the second part 34 of the conveying run 31 tangentially meets the first circumference 45 of the first pulley 41 at a first tangent point F3, that the second part 36 of the return run 32 tangentially meets the second circumference 46 of the second pulley 42 at a second tangent point F4 and that the length of the loops of the endless belts 30 between said first tangent point F3 and said second tangent point F4 is constant, regardless of the swivel position of the third pulley 43. In other words, the length of the actual loop of the endless belts 30 and/or the length of the minimal loop L between the first tangent point F3 and the second tangent point F4 that does not extend around the third pulley 43 remains constant. The pivot position Y is chosen such that the remaining length of the loops of the endless belts 30 that extends from first tangent point F3 on the first pulley 41 around the third pulley 43 to the second tangent point F4 on the second pulley 42 is the same within a tolerance of less than 1 percent when the third pulley 43 is in the second swivel position with respect to the same length when the third pulley 43 is in the first swivel position.

Hereafter are several characteristics of the pivot position Y that allow for the third pulley axis S3 to follow a circular path A that, at least between the first swivel position and the second swivel position, best approximates the ideal and/or average elliptical path.

The third pulley axis S3 is at a first path point P1 on the circular path A when the third pulley 43 is in the first swivel position, as shown in FIGS. 2 and 4, and the third pulley axis S3 is at a second path point P2 on the circular path A when the third pulley 43 is in the second swivel position, as shown in FIGS. 3 and 6. The circular path A between the first path point P1 and the second path point P2 comprises a circular arc B along which the third pulley axis S3 travels when the third pulley 43 is swivelled about the swivel axis X from the first swivel position to the second swivel position. The pivot position Y is chosen such that said circular arc B approximates the ideal and/or average elliptical path.

FIG. 4 shows a first elliptical path E1 defined by the first focus point F1, the second focus point F2 and the first path point P1 when the third pulley 43 is in the first swivel position. FIG. 6 shows a second elliptical path E2 defined by the first focus point F1, the second focus point F2 and the second path point P2 when the third pulley 43 is in the second swivel position. Said second elliptical path E2 is slightly different from the first elliptical path E1 because the third pulley axis S3 has moved along the circular arc B rather than the first elliptical path E1. FIG. 5 shows an intermediate third elliptical path E3 defined by the first focus point F1, the second focus point F2 and a third path point P3 when the third pulley 43 is in an intermediate third swivel position between the first swivel position and the second swivel position. Said third elliptical path E3 is again slightly different from the first elliptical path E1 and the second elliptical path E2. The pivot position Y is chosen such that the circular arc B approximates the average of the first elliptical path E1, the second elliptical path E2 and/or the third elliptical path E3.

The pivot position Y can also be characterised in that when the first circumference 45 and the second circumference 46 are connected by outer tangents T1, T2, the pivot position Y is located in the intermediate area defined by said outer tangents T1, T2. The pivot position Y can further be characterised in that when the first pulley axis S1 and the second pulley axis S2 are connected by a center-to-center line T3, the pivot position Y is located behind the center-to-center line T3 with respect to the third pulley 43. Additionally or alternatively, the pivot position Y can be characterised in that when the first pulley axis S1 and the second pulley axis S2 are connected by a center-to-center line T3, the pivot position Y is projectable onto the center-to-center line T3 in a direction normal to said center-to-center line T3 at half or approximately half the distance between the first pulley axis S1 and the second pulley axis S2.

In the example as shown in FIGS. 4, 5 and 6, the diameters of the first pulley 41, the second pulley 42, the third pulley 43 and the fourth pulley 44 are 50 millimeters, 50 millimeters, 30 millimeters and 30 millimeters, respectively. The first pulley axis S1 and the second pulley axis S2 are spaced apart in a vertical direction V over 100 millimeters. The first pulley axis S1 is located at 20 millimeters upstream of the second pulley axis S2 with respect to the direction of conveyance D. The first pulley axis S1 and the fourth pulley axis S4 are spaced apart over 160 millimeters in the direction of conveyance D. The fourth pulley 44 is positioned such that the second part 34 of the conveying run 31 extends horizontally. The first part 33 of the conveying run 31 has an swivel angle Z of 1 degree with respect to the horizontally extending second part 34 of the conveying run 31 when the third pulley 43 is in the first swivel position, as shown in FIG. 4, and an angle of 21 degrees with respect to the horizontally extending second part 34 of the conveying run 31 when the third pulley 43 is in the second swivel position, as shown in FIG. 6. The pivot position Y is located at 25.27 millimeters downstream of the first pulley axis S1 with respect to the direction of conveyance D and at 46.36 millimeters below the first pulley axis S1 in the vertical direction V. The radius of the circular path A, and thus of the circular arc B, is 185.31 millimeters. With said dimensions, the length of the actual loop varies between 799.99 millimeters and 800.01 between the first swivel position and the second swivel position. Hence, when the length of the one or more endless belts 30 is chosen at 800 millimeters, the length of the actual loop will be within a tolerance of 0.01 millimeters between the first swivel position and the second swivel position. Moreover, with said dimensions, the length of the minimal loop L varies between 588.40 millimeters and 588.42 between the first swivel position and the second swivel position. Hence the length of the minimal loop L will be within a tolerance of 0.01 millimeters of the average length of the minimal loop L at the first swivel position and the second swivel position.

Moreover, it can be observed from FIGS. 4, 5 and 6 that the angle between the first part 33 of the conveying run 31 and the first part 35 of the return run 32 is relatively sharp, e.g. smaller than 90 degrees.

One skilled in the art will appreciate that the dimensions above are merely provided as an example to demonstrate the working principle of the invention. The same working principle applies to various other dimensions as well. The pivot point Y can be calculated for each configuration by entering the parameters of the first pulley 41, the second pulley 42 and the third pulley 43 into a computer program that can calculate the trajectory of the third pulley axis S3 of the third pulley 43, not bound by the pivot point Y, with respect to the first pulley 41 and the second pulley 42 assuming that the length of the minimal loop L is kept constant. This results in the third pulley 43 moving along the ideal and/or average elliptical path. By plotting path points along this ideal and/or average elliptical path for three intended swivel positions, the circular path A and/or the circular arc B through said three swivel positions can be drawn.

As shown in FIG. 1, the swivel conveyor 3 comprises a swivel arm 5 for supporting the third pulley 43 in a swivable manner about the swivel axis X. The swivel conveyor 3 further comprises a swivel drive 6 that is arranged to drive the swivel arm 5 in the swivelling motion W about the swivel axis X to swivel the third pulley 43 between the first swivel position, as shown in FIGS. 2 and 4, and the second swivel position, as shown in FIGS. 3 and 6. In this exemplary embodiment, the swivel drive 6 is a piston that engages the swivel arm 5 at a position spaced apart from the swivel axis X to rotate said swivel arm 5 about said swivel axis X. Alternative, the swivel drive 6 may be provided as a rotational drive, e.g. a servo motor, that engages the swivel arm 5 directly at the swivel axis X.

Figure 7:
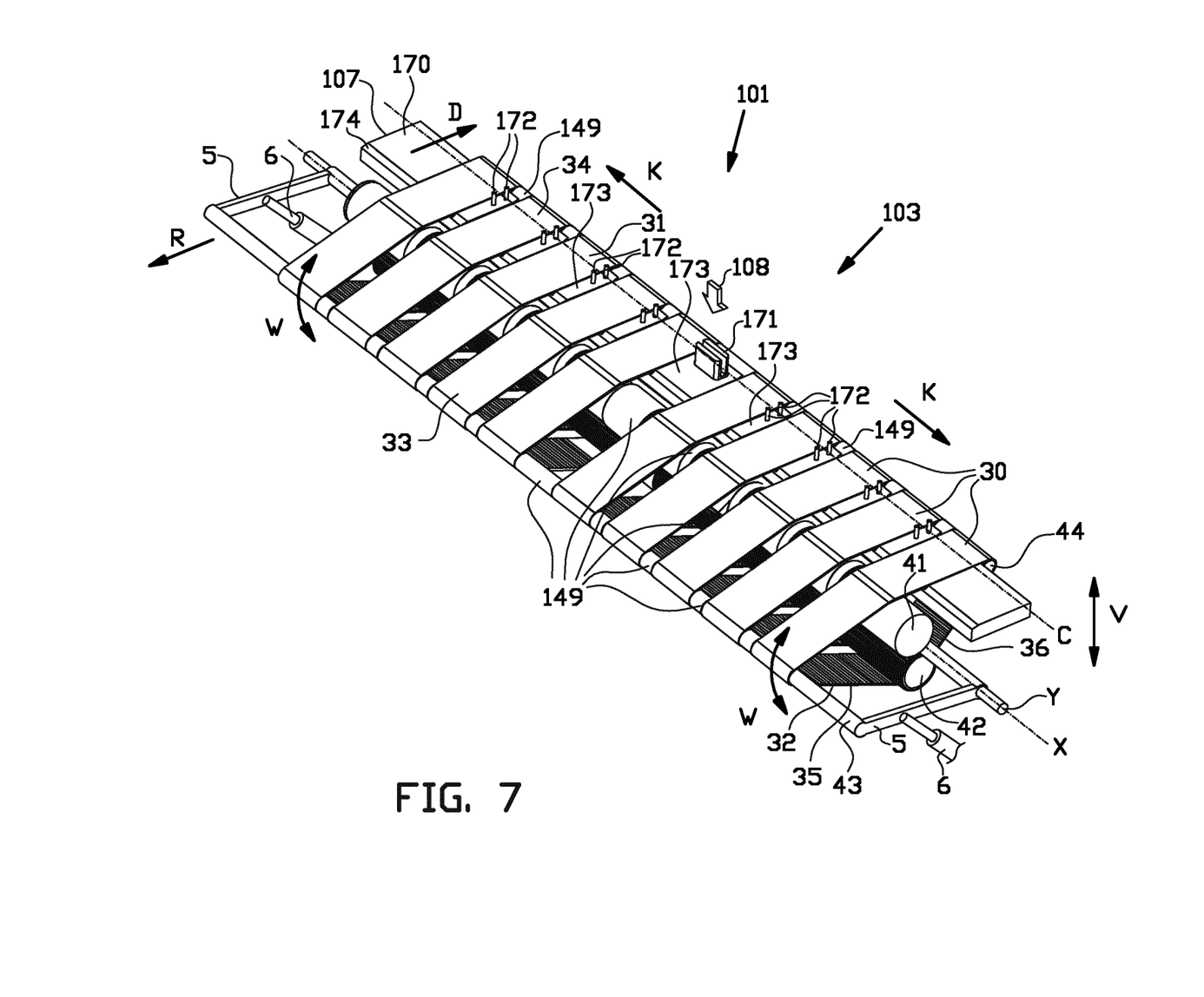
FIG. 7 shows an isometric view of an alternative conveying apparatus according to a second exemplary embodiment of the invention.

FIG. 7 shows an alternative conveying apparatus 101 according to a second exemplary embodiment of the invention. Said alternative conveying apparatus 101 differs from the previously discussed conveying apparatus 1 in that its swivel conveyor 103 comprises a cutting device 107 that is movable from a retracted position within the actual loops of the respective endless belts into a cutting position, as shown in FIG. 7, in which the cutting device 107 at least partially protrudes outside the actual loops and through the spacing between the respective endless belts 30 at the conveying run 31. More in particular, the cutting device 107 is arranged to protrude through the spacing between the endless belts 30 at the second part 34 of the conveying run 31, between the first pulley 41 and the fourth pulley 44.

In this exemplary embodiment, the cutting device 107 comprises a beam 170 that is arranged to extend on the inside of the actual loops of the respective endless belts at the conveying run 31 and an anvil 171 that is movable with respect to said beam 170 through the spacing between the respective endless belts 30 at the conveying run 31 from the retracted position into the cutting position, as shown in FIG. 7. In particular, the anvil 171 is movable through one of the spacings at or near the center of the swivel conveyor 103. The anvil 171 is movable in a lifting direction that is preferably parallel to the vertical direction V. The anvil 171 is used to cooperate with a knife 108. Said knife 108 is movable along a cutting line C across the swivel conveyor 103, preferably in the lateral direction K. In this example, the knife 108 is arranged for cutting into the tire layer 9 at the anvil 171 and for subsequently moving in one or both directions along the cutting line C to cut a first part of the tire layer 9. The anvil 171 is arranged for supporting and/or lifting the tire layer 9 with respect to the endless belts 30 towards the knife 108 to allow for the knife 108 to cut into the tire layer 9 without cutting into the endless belts 30.

The cutting line C is preferably at fifty millimeters or less, and preferably at thirty millimeters or less from the fourth pulley 44 in the direction of conveyance D. Hence, a relatively short part of the tire layer 9 can be cut-off and discharged in the direction of conveyance D, e.g. as a waste part before cutting off a subsequent part of tire layer 9. The remaining part of the tire layer 9 may be retracted in a retraction direction R opposite to the direction of conveyance D to avoid that the cut-off part attaches or adheres again to the remaining part of the tire layer 9.

The cutting device 107 further comprises a plurality of push-up members 172 that are movable with respect to said beam 170 through the spacing between the respective endless belts 30 at the conveying run 31 from the retracted position into the cutting position, as shown in FIG. 7. The push-up members 172 can lift the tire layer 9 in a lifting direction, preferably parallel to the vertical direction V, from the endless belts 30 along the cutting line C so that the knife 108 can be moved along said cutting line C without cutting into the endless belts 30.

Preferably, the beam 170 comprises a plurality of supports 173 that are arranged to be flush or substantially flush with the endless belts 30 in the spacing between said endless belts 30 at the conveying run 31. The beam 170 has a bevelled edge 174 facing opposite to the direction of conveyance D to deflect the tire layer 9 over the beam 170 in said direction of conveyance D.

As shown in FIG. 7, one or more of the pulleys 41-44 are provided with a plurality of circumferentially extending guide elements 149 at the spacing between the respective endless belts 30 for guiding the respective endless belts 30. Said guide elements 149 are arranged to be flush or substantially flush with the endless belts 30 in the spacing between said endless belts 30 at the conveying run 31 to support the tire layer 9 and to guide and/or keep the endless belts 30 in position.

It is further noted that the one or more endless belts 30 are easily removable from the pulleys 41-44 in the lateral direction K parallel to the swivel axis X.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

For example, the skilled person will appreciate that the swivel conveyor according to the invention can be used in combination with a different number of supply conveyors and/or discharge conveyors. The direction of conveyance may be opposite to the direction of conveyance as shown in FIGS. 1-7, in which case the swivel conveyor receives tire layers from a single supply conveyor 23 and discharges said tire layers selectively to one of the discharge conveyors 21, 22.

The invention claimed is:

1. A conveying apparatus for conveying a tire layer, wherein the conveying apparatus comprises a swivel conveyor with at least one endless belt or wire and a first pulley, a second pulley and a third pulley that define a minimal loop (L) for guiding said at least one endless belt or wire along a conveying run and a return run, wherein the first pulley defines at least a first part of the conveying run, wherein the second pulley defines at least a first part of the return run and wherein the third pulley is arranged between the first part of the conveying run and the first part of the return run, wherein the third pulley is swivable with respect to the first pulley and the second pulley about a swivel axis (X) that is located at a pivot position (Y) spaced apart from the third pulley towards the first pulley and the second pulley, wherein the third pulley is swivable about said swivel axis (X) between a first swivel position and a second swivel position to align the first part of the conveying run with a first conveying plane (H1) and a second conveying plane (H2), respectively, wherein the minimal loop (L) has a length, wherein the pivot position (Y) is chosen such that the length of the minimal loop (L) when the third pulley is in the first swivel position is the same within a tolerance of less than 1 percent with respect to the length of the minimal loop (L) when the third pulley is in the second swivel position.

2. The conveying apparatus according to claim 1, wherein the tolerance is selected from the group consisting of 0.4 percent, less than 0.1 percent and less than 0.05 percent.

3. The conveying apparatus according to claim 1, wherein the tolerance is selected from the group consisting of less than half a millimeter, less than one-tenth of a millimeter, less than one-twentieth of a millimeter and less than one-fiftieth of a millimeter.

4. The conveying apparatus according to claim 1, wherein the pivot position (Y) is chosen such that the length of the minimal loop (L) is the same within the tolerance for any swivel position of the third pulley about the swivel axis (X) between the first swivel position and the second swivel position.

5. The conveying apparatus according to claim 1, wherein the first pulley and the second pulley have a first circumference and a second circumference, respectively, wherein the first circumference and the second circumference are connectable by two outer tangents (T1, T2) that define an intermediate area between the first pulley and the second pulley, wherein the pivot position (Y) is located inside the intermediate area.

6. The conveying apparatus according to claim 1, wherein the third pulley has a third pulley axis (S3) that is movable along a circular path (A) that is concentric to the pivot position (Y), wherein the third pulley axis (S3) is at a first path point (P1) and at a second path point (P2) on the circular path (A) when the third pulley is in the first swivel position and the second swivel position, respectively, wherein the first pulley and the second pulley have a first circumference and a second circumference, respectively, wherein the circular path (A) between the first path point (P1) and the second path point (P2) comprises a circular arc (B) that approximates a first elliptical path (E1) defined by a first focus point (F1) that is located on or within the first circumference, a second focus point (F2) that is located on or within the second circumference and the first path point (P1).

7. The conveying apparatus according to claim 6, wherein the circular arc (B) approximates the average of the first elliptical path (E1) and a second elliptical path (E2) that is defined by the first focus point (F1), the second focus point (F2) and the second path point (P2).

8. The conveying apparatus according to claim 6, wherein the first part of the conveying run extends between the first pulley and the third pulley and tangentially meets the first circumference at the first focus point (F1), wherein the first part of the return run extends between the second pulley and the third pulley and tangentially meets the second circumference at the second focus point (F2), wherein the first focus point (F1) and the second focus point (F2) shift along the first circumference and the second circumference, respectively, as the third pulley is swivelled between the first swivel position and the second swivel position.

9. The conveying apparatus according to claim 1, wherein the first pulley and the second pulley have a first pulley axis (S1) and a second pulley axis (S2), respectively, wherein the first pulley axis (S1) and the second pulley axis (S2) are connectable by a center-to-center line (T3), wherein the pivot position (Y) is located at the opposite side of the center-to-center line (T3) with respect to the third pulley.

10. The conveying apparatus according to claim 1, wherein the first pulley and the second pulley have a first pulley axis (S1) and a second pulley axis (S2), respectively, wherein the first pulley axis (S1) and the second pulley axis (S2) are connectable by a center-to-center line (T3), wherein the pivot position (Y) is projectable onto the center-to-center line (T3) in a direction normal to said center-to-center line (T3) at half the distance between the first pulley axis (S1) and the second pulley axis (S2).

11. The conveying apparatus according to claim 1, wherein the first swivel position and the second swivel position are offset with respect to each other about the swivel axis (X) over a swivel angle (Z) selected from the group consisting of less than forty degrees, less than thirty degrees and less than twenty-five degrees.

12. The conveying apparatus according to claim 11, wherein the first swivel position and the second swivel position are offset with respect to each other about the pivot position (X) over a swivel angle (Z) selected from the group consisting of at least than ten degrees, at least fifteen degrees and at least twenty degrees.

13. The conveying apparatus according to claim 1, wherein the swivel conveyor comprises a swivel arm for supporting the third pulley in a swivable manner about the swivel axis (X).

14. The conveying apparatus according to claim 13, wherein the swivel conveyor comprises a swivel drive that is arranged to drive the swivel arm in a swivelling motion about the swivel axis (X) to swivel the third pulley between the first swivel position and the second swivel position.

15. The conveying apparatus according to claim 1, wherein at least one of the plurality of pulleys is a driven pulley for driving the at least one endless belt or wire.

16. The conveying apparatus according to claim 15, wherein the at least one endless belt is a toothed belt, wherein the driven pulley is a toothed drive pulley that is arranged to engage with the toothed belt to drive said toothed belt.

17. The conveying apparatus according to claim 15, wherein the second pulley is the drive pulley.

18. The conveying apparatus according to claim 1, wherein the conveying run of the at least one endless belt or wire is arranged to be driven in a direction of conveyance (D), wherein the third pulley is a tail pulley with respect to said direction of conveyance (D).

19. The conveying apparatus according to claim 18, wherein the swivel conveyor comprises a fourth pulley on the opposite side of the first pulley and the second pulley with respect to the third pulley, wherein the fourth pulley is arranged for, together with the first pulley, forming at least a second part of the conveying run downstream of the first part of the conveying run in the direction of conveyance (D).

20. The conveying apparatus according to claim 19, wherein the fourth pulley is a head pulley with respect to the direction of conveyance (D).

21. The conveying apparatus according to claim 1, wherein the swivel conveyor comprises a plurality of the endless belts or wires, wherein each endless belt or wire extends in an actual loop around the plurality of pulleys, wherein the conveying runs of the respective endless belts or wires are arranged to be driven in a direction of conveyance (D), wherein the endless belts or wires are arranged side by side in a lateral direction (K) perpendicular to the direction of conveyance (D).

22. The conveying apparatus according to claim 21, wherein the endless belts or wires are spaced apart in the lateral direction (K).

23. The conveying apparatus according to claim 22, wherein the swivel conveyor comprises a cutting device that is movable from a retracted position within the actual loops of the respective endless belts or wires into a cutting position in which the cutting device protrudes at least partially outside the actual loops and through the spacing between the respective endless belts or wires at the conveying run.

24. The conveying apparatus according to claim 23, wherein the swivel conveyor comprises a fourth pulley on the opposite side of the first pulley and the second pulley with respect to the third pulley, wherein the fourth pulley is arranged for, together with the first pulley, forming at least a second part of the conveying run downstream of the first part of the conveying run in the direction of conveyance (D), wherein the cutting device is arranged to protrude at least partially outside the actual loops and through the spacing between the respective endless belts or wires at the second part of the conveying run.

25. The conveying apparatus according to claim 23, wherein the cutting device comprises a beam that is arranged to extend on the inside of the actual loops of the respective endless belts or wires at the conveying run and an anvil that is arranged to be movable with respect to said beam through the spacing between the respective endless belts or wires at the conveying run from the retracted position into the cutting position.

26. The conveying apparatus according to claim 25, wherein the cutting device comprises a plurality of push-up members that are arranged to be movable with respect to said beam through the spacing between the respective endless belts or wires at the conveying run from the retracted position into the cutting position.

27. The conveying apparatus according to claim 25, wherein the beam comprises a plurality of supports that are arranged to be flush with the endless belts or wires in the spacing between said endless belts or wires at the conveying run to support the tire layer.

28. The conveying apparatus according to claim 25, wherein the beam has a bevelled edge facing opposite to the direction of conveyance (D) to deflect the tire layer over the beam in said direction of conveyance (D).

29. The conveying apparatus according to claim 25, wherein the beam extends along a cutting line (C) for cooperating with a knife along said cutting line (C), wherein the cutting line (C) is at fifty millimeters or less or at thirty millimeters or less from the fourth pulley.

30. The conveying apparatus according to claim 22, wherein the first pulley, the second pulley or the third pulley are provided with a plurality of circumferentially extending guide elements at the spacing between the respective endless belts or wires for guiding the respective endless belts or wires.

31. The conveying apparatus according to claim 30, wherein the guide elements are arranged to be flush with the endless belts or wires in the spacing between said endless belts or wires at the conveying run to support the tire layer.

32. Conveying apparatus according to claim 1, wherein the conveying apparatus further comprises a first supply conveyor and a second supply conveyor extending in the first conveying plane (H1) and the second conveying plane (H2), respectively, upstream of the swivel conveyor and a discharge conveyor extending in a third conveying plane (H3) downstream of the swivel conveyor in the direction of conveyance (D), wherein the swivel conveyor is arranged to convey a first tire layer from the first supply conveyor to the discharge conveyor when the first part of the conveying run is aligned with the first conveying plane (H1) and to convey a second tire layer from the second supply conveyor to the discharge conveyor when the first part of the conveying run is aligned with the second conveying plane (H2).

33. The conveying apparatus according to claim 32, wherein the first conveying plane (H1) and the third conveying plane (H3) are parallel or within less than two degrees from each other.

34. The conveying apparatus according to claim 32, wherein the second conveying plane (H2) is offset over a swivel angle (Z) selected from the group consisting of less than forty degrees, less than thirty degrees and less than twenty-five degrees with respect to the first conveying plane (H1).

35. A method for conveying a tire layer between a first supply conveyor and a second supply conveyor extending in a first conveying plane (H1) and a second conveying plane (H2), respectively, upstream in a direction of conveyance (D) of a discharge conveyor extending in a third conveying plane (H3), wherein the method comprises providing a swivel conveyor with at least one endless belt or wire and a first pulley, a second pulley and a third pulley that define a minimal loop (L) for guiding said at least one endless belt or wire along a conveying run and a return run, wherein the first pulley defines at least a first part of the conveying run, wherein the second pulley defines at least a first part of the return run and wherein the third pulley is arranged between the first part of the conveying run and the first part of the return run, wherein the third pulley is swivable with respect to the first pulley and the second pulley about a swivel axis (X) that is located at a pivot position (Y) spaced apart from the third pulley towards the first pulley and the second pulley, wherein the third pulley is swivable about said swivel axis (X) between a first swivel position and a second swivel position to align the first part of the conveying run with a first conveying plane (H1) and a second conveying plane (H2), respectively, wherein the minimal loop (L) has a length, wherein the pivot position (Y) is chosen such that the length of the minimal loop (L) when the third pulley is in the first swivel position is the same within a tolerance of less than 1 percent with respect to the length of the minimal loop (L) when the third pulley is in the second swivel position, wherein the method comprises the steps of:

swiveling the third pulley with respect to the first pulley and the second pulley about the swivel axis (X) between the first swivel position and the second swivel position while keeping the length of the minimal loop (L) the same within the tolerance when the third pulley is in the first swivel position and in the second swivel position; and using the swivel conveyor to convey a first tire layer from the first supply conveyor to the discharge conveyor when the first part of the conveying run is aligned with the first conveying plane (H1) and to convey a second tire layer from the second supply conveyor to the discharge conveyor when the first part of the conveying run is aligned with the second conveying plane (H2).

36. The method according to claim 35, wherein the length of the minimal loop (L) is kept the same within the tolerance for any swivel position of the third pulley about the swivel axis (X) between the first swivel position and the second swivel position.

37. The method according to claim 35, wherein the method further comprises the steps of cutting off a part of the first tire layer or the second tire layer at the conveying run of the swivel conveyor, discharging the cut-off part onto the discharge conveyor and retracting the remaining part of the first tire layer or the second tire layer in a retraction direction (R) opposite to the direction of conveyance (D).

38. The method according to claim 35, wherein the method further comprises the step of replacing the at least one endless belt or wire during maintenance, wherein the at least one endless belt or wire is removable from the first pulley, the second pulley and the third pulley in a lateral direction (K) parallel to the swivel axis (X).

39. A method for conveying a tire layer between a first discharge conveyor and a second discharge conveyor extending in a first conveying plane (H1) and a second conveying plane (H2), respectively, downstream in a direction of conveyance (D) of a supply conveyor extending in a third conveying plane (H3), wherein the method comprises providing a swivel conveyor with at least one endless belt or wire and a first pulley, a second pulley and a third pulley that define a minimal loop (L) for guiding said at least one endless belt or wire along a conveying run and a return run, wherein the first pulley defines at least a first part of the conveying run, wherein the second pulley defines at least a first part of the return run and wherein the third pulley is arranged between the first part of the conveying run and the first part of the return run, wherein the third pulley is swivable with respect to the first pulley and the second pulley about a swivel axis (X) that is located at a pivot position (Y) spaced apart from the third pulley towards the first pulley and the second pulley, wherein the third pulley is swivable about said swivel axis between a first swivel position and a second swivel position to align the first part of the conveying run with a first conveying plane (H1) and a second conveying plane (H2), respectively, wherein the minimal loop (L) has a length, wherein the pivot position (Y) is chosen such that the length of the minimal loop (L) when the third pulley is in the first swivel position is the same within a tolerance of less than 1 percent with respect to the length of the minimal loop (L) when the third pulley is in the second swivel position, wherein the method comprises the steps of:

swivelling the third pulley with respect to the first pulley and the second pulley about the swivel axis (X) between the first swivel position and the second swivel position while keeping the length of the minimal loop (L) the same within the tolerance when the third pulley is in the first swivel position and in the second swivel position; and     using the swivel conveyor to convey a first tire layer from the supply conveyor to the first discharge conveyor when the first part of the conveying run is aligned with the first conveying plane (H1) and to convey a second tire layer from the supply conveyor to the second discharge conveyor when the first part of the conveying run is aligned with the second conveying plane (H2).

\* \* \* \* \*